United States Patent [19]

Orikasa et al.

[11] Patent Number: 4,983,663

[45] Date of Patent: Jan. 8, 1991

[54] THERMOPLASTIC RESIN COMPOSITION AND METHOD FOR PREPARING THE SAME

[75] Inventors: Yuichi Orikasa, Yokohama; Suehiro Sakazume, Fujisawa; Sadahiro Nishimura, Kawasaki; Yoshinori Maki, Chigasaki, all of Japan

[73] Assignees: Nippon Petrochemicals Co.; Nippon Oil & Fats Co., Ltd., both of Japan

[21] Appl. No.: 263,723

[22] Filed: Oct. 28, 1988

[30] Foreign Application Priority Data

Oct. 30, 1987 [JP] Japan .................................. 62-276710
Jan. 20, 1988 [JP] Japan .................................. 63-10499

[51] Int. Cl.$^5$ ....................... C08L 55/02; C08L 67/02; C08L 77/00
[52] U.S. Cl. ...................................... 524/504; 524/513; 524/514; 525/64; 525/66; 525/166; 525/179
[58] Field of Search .................... 525/64, 166, 66, 179; 524/504, 513, 514

[56] References Cited

U.S. PATENT DOCUMENTS

| | | | |
|---|---|---|---|
| 3,919,353 | 11/1975 | Castelnuovo | 525/64 |
| 4,172,859 | 10/1979 | Epstein | 428/402 |
| 4,461,871 | 7/1984 | Kometani | 525/166 |
| 4,713,415 | 12/1987 | Lavengood | 525/66 |
| 4,780,505 | 10/1988 | Mashita | 525/66 |

*Primary Examiner*—Patricia Short
*Attorney, Agent, or Firm*—Ostrolenk, Faber, Gerb & Soffen

[57] ABSTRACT

There is here provided a thermoplastic resin composition containing (I) 99 to 1% by weight of an ABS resin, (II) 1 to 99% by weight of at least one kind of resin selected from an aromatic polyester resin and a polyamide resin (III) 0.1 to 100 parts by weight, based on 100 parts by weight of the aforesaid resins (I)+(II), of a multiphase structure thermoplastic resin which is composed of 5 to 95% by weight of an epoxy group-containing olefin copolymer and 95 to 5% by weight of a vinyl polymer or copolymer obtained from at least one kind of vinyl monomer, either of the polymer or copolymer being in the state of a dispersion phase having a particle diameter of 0.001 to 10 μm. A method for preparing the above-mentioned thermoplastic resin composition is also provided here.

12 Claims, 1 Drawing Sheet

THERMOPLASTIC RESIN COMPOSITION AND METHOD FOR PREPARING THE SAME

BACKGROUND OF THE INVENTION (1) Field of the Invention

The present invention relates to a thermoplastic resin composition having excellent impact resistance, chemical resistance, moldability, dimensional stability and appearance of molded articles made therefrom. This composition of the present case can be widely utilized as materials for industrial parts, electrical and electronic machine parts, automobile parts and the like.

(2) Description of the Prior Art

In recent years, with regard to the engineering plastics, new additional functions are demanded, and various attempts have been made to satisfy the. One of them is a composition comprising a combination of plural engineering plastics, and this composition has features of the respective plastics and is known as a polymer alloy.

For example, an alloy of an ABS resin and an aromatic polyester resin is known, and this alloy intends to make up for bad chemical resistance which is the drawback of the ABS resin by the use of the aromatic polyester resin and additionally aims at providing heat resistance. According to another viewpoint, it is contemplated that the impact resistace of the aromatic polyester resin is improved by the ABS resin. In like manner, an alloy comprising the ABS resin and a polyamide resin and remaining features thereof can also be conceived.

However, the two resins of the ABS resin and the aromatic polyester resin are difficult to disperse into each other, and Japanese Patent Provisional Publication No. 51-42794 indicates that the ABS resin cannot be mixed with the aromatic polyester resin when the amount of the ABS resin becomes 10% by weight or more based on the weight of the aromatic polyester resin. Japanese Patent Provisional Publication No. 60-63250 discloses a dispersion improvement manner in which a modified polyolefin is additionally used together. This manner can improve the compatibility between both the resins, but betterment of stiffness, impact resistance, heat distortion temperature and the like of the mixture is insufficient.

On the other hand, there is no example of mixing the ABS resin with the polyamide, and if the compatibility between both the resins is improved, a useful material can be supplied.

SUMMARY OF THE INVENTION

The inventors of the present application have intensively researched to solve the above-mentioned problems, and as a result, they have found that when a specific multi-phase structure thermoplastic resin is additionally blended, compatibility can be improved, so that a composition can be obtained which retains features of the respective resins and further has excellent impact resistance, chemical resistance, dimensional stability and appearance of molded articles made therefrom. In consequence, the present invention has been completed on the basis of this knowledge.

That is, the first aspect of the present invention is directed to a thermoplastic resin composition containing (I) 99 to 1% by weight of an ABS resin, (II) 1 to 99% by weight of at least one kind of resin selected from an aromatic polyester resin and a polyamide resin III 0.1 to 100 parts by weight, based on 100 parts by weight of the aforesaid resins (I)+(II), of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, either of the polymer or copolymer being in the state of a dispersion phase having a particle diameter of 0.001 to 10 $\mu$m.

The second aspect of the present invention is directed to a method for preparing a thermoplastic resin composition which comprises the step of melting and mixing an ABS resin (I) and at least one kind of resin (II) selected from an aromatic polyester resin and a polyamide resin, with 1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of an epoxy group-containing olefin copolymer, then heating the suspension under such conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator, and raising the temperature of this aqueous suspension, when the degree of the impregnation has reached 50% by weight of the original total weight of the vinyl monomer, peroxide and initiator, in order to copolymerize the vinyl monomer with the radical polymerizable or copolymerizable organic peroxide in the epoxy group-containing olefin copolymer, 0 to 99% by weight of the epoxy group-containing olefin copolymer (B), and 0 to 99% by weight of a vinyl polymer or copolymer (C) obtained by polymerizing at least one kind of vinyl monomer, or alternatively melting and mixing the components (A), (B) and (C) previously at a temperature in the range of 100 to 300° C. in order to form a multi-phase structure thermoplastic resin (III), and then melting and mixing the resin (III) with the resins (I) and (II).

BRIEF DESCRIPTION OF THE PHOTOGRAPH

Photograph No. 1 is an electron microscope photograph (5,000 magnifications) of the multi-phase structure thermoplastic resin prepared in Preparation Example 2 in which spherical styrene polymer particles having a diameter of 0.1 to 0.3 $\mu$m are dispersed in a matrix comprising ethylene-glycidyl methacrylate (E-GMA).

This photograph is indicated with "E-GMA-g-PSt: multi-phase structure thermoplastic resin".

DETAILED DESCRIPTION OF THE INVENTION

The ABS resin used in the present invention is a graft copolymer (Ia) obtained by polymerizing, in the presence of a conjugated diene rubber, two or more kinds of compounds selected from the group consisting of vinyl cyanide compounds, aromatic vinyl compounds and alkyl ester compounds of unsaturated carboxylic acids. If necessary, the ABS resin may contain a copolymer (Ib) obtained by polymerizing two or more compounds selected from the group consisting of vinyl cyanide compounds, aromatic vinyl compounds and alkyl ester compounds of unsaturated carboxylic acids.

The composition ratio between the conjugated diene rubber and the above-mentioned compounds in the graft copolymer (Ia) is not limited particularly, but it is preferred that the conjugated diene rubber is in a ratio of 5 to 80% by weight and the above-mentioned compounds are in a ratio of 95 to 80% by weight. Furthermore, the preferable composition ratio of the above-mentioned compounds is 0 to 30% by weight of the vinyl cyanide compound, 30 to 80% by weight of the aromatic vinyl compound and 0 to 70% by weight of the alkyl ester compound of the unsaturated carboxylic acid. Incidentally, the particle diameter of the conjugated diene rubber is not limited particularly, but it is preferably in the range of 0.05 to 1 μm.

The preferable composition ratio of the above-mentioned compounds constituting the copolymer (Ib) is 0 to 30% by weight of the vinyl cyanide compound, 50 to 90% by weight of the aromatic vinyl compound and 0 to 40% by weight of the alkyl ester compound of unsaturated carboxylic acid. The intrinsic viscosity [30° C., dimethylformadimde DMF)] of the copolymer (Ib) is not limited particularly, either, but it is preferably in the range of 0.25 to 1.0.

Examples of the conjugated diene rubber include polybutadiene, butadiene-styrene copolymer and butadieneacrylonitrile copolymer.

Examples of the vinyl cyanide compound include acrylonitrile and methacrylonitrile, and examples of the aromatic vinyl compound include styrene, α-methylstyrene, vinyltoluene, dimethylstyrene and chlorostyrene. Moreover, examples of the alkyl ester compound of the unsaturated carboxylic acid include methyl acrylate, ethyl acrylate, butyl acrylate, methyl methacrylate and hydroxyethyl acrylate.

The ABS resin may be prepared by an emulsion polymerization process, a suspension polymerization process, a solution polymerization, a mass polymerization, an emulsion-suspension polymerization process or the like.

The aromatic polyester resin used in the present invention is a polyester having an aromatic ring on a chain unit thereof, and it is a polymer or copolymer obtained by subjecting, to condensation reaction, an aromatic dicarboxylic acid (or its ester-forming derivative) and a diol (or its ester-forming derivative) as main components.

Examples of the aromatic dicarboxylic acid mentioned above include terephthalic acid, isophthalic acid, phthalic acid, 2,6-naphthalenedicarboxylic acid, 1,5-naphthalenedicaroxyolic acid, bis(p-carboxyphenyl)methane, anthracenedicaroxylic acid, 4,4'-diphenyldicarboxylic acid, 4,4'-diphenyl ether dicarboxylic acid, 1,2-bis(phenoxy)-ethane-4,4'-dicarboxylic acid, and ester-forming derivatives thereof.

Examples of the above-mentioned diol component include aliphatic diols having 2 to 10 carbon atoms, i.e., ethylene glycol, propylene glycol, 1,4-butanediol, neopentyl glycol, 1,5-pentanediol, 1,6-hexanediol, decamethylene glycol and cyclohexanediol; long-chain glycols each having a molecular weight of 400 to 6,000, i.e., polyethylene glycol, poly(1,3-propylene glycol) and polytetramethylene glycol; and mixtures thereof.

Typical and preferable examples of the thermoplastic aromatic polyester resin used in the present invention include polyethylene terephthalate, polypropylene terephthalate, polybutylene terephthalate, polyhexamethylene terephthalate, polyethylene-2,6-naphthenate and polyethylene-1,2-bis(phenoxy)ethane-4,4'-dicarboxylate. Of these examples, polyethylene terephthalate and polybutylene terephthalate are more preferable.

The intrinsic viscosity of the thermoplastic aromatic polyester resin is preferably in the range of 0.4 to 4.0 dl/g at 25±0.1° C. at a concentration of 0.32 g in 100 milliliters of trifluoric acid (25)/methylene chloride (75).

When the intrinsic viscosity is less than 0.4 dl/g, the thermoplastic aromatic polyester resin cannot exert mechanical strength sufficiently. Inversely, when it is in excess of 4.0 dl/g, the flowability of the resin deteriorates, which leads to the decaline of the surface gloss on molded articles thereof.

Examples of a polyamide resin used in the present invention include aliphatic polyamide resins such as 6-nylon, 6,6-nylon, 6,10-nylon, 6,12-nylon, 11-nylon, 12-nylon and 4,6-nylon; aromatic polyamide resins such as polyhexamethylenediamine terephthalamide, polyhexamethylenediamine isophthalamide and xylene group-containing polyamide; modified compounds of these polyamides; and mixtures thereof. The particularly preferable polyamides are 6-nylon and 6,6-nylon.

The epoxy group-containing olefin copolymer used in the multi-phase structure thermoplastic resin regarding the present invention is a copolymer of an olefin formed by a high-pressure radical polymerization and an unsaturated glycidyl group-containing monomer, or a terpolymer of an olefin, an unsaturated glycidyl group-containing monomer and another unsaturated monomer, or a multicomponent copolymer. The particularly preferable olefin of the copolymer is ethylene, and the preferable copolymer comprises 60 to 99.5% by weight of ethylene, 0.5 to 40% by weight of the glycidyl group-containing monomer and 0 to 39.5% by weight of another unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of maleic acid, crotonic acid and fumaric acid, allyl glycidyl ether, glycidyloxy ethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, vinyl esters, α,β-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, itaconic acid, fumaric acid, maleic monoesters and diesters, vinyl ethers such as vinyl chloride, vinyl methyl ether and viny ethyl ether, and acrylic amide compounds. Particularly, acrylic and methacrylic esters are preferable.

Typical examples of the epoxy group-containing olefin copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethylene-glycidyl methacrylate copolymer, ethylene-ethyl acrylate-glycidyl methacrylate copolymer and ethylene-vinyl acetate-glycidyl methacrylate copolymer are preferred.

These epoxy group-containing olefin copolymers can be used in a mixture thereof.

The epoxy group-containing olefin copolymer may be prepared by a high-pressure radical polymerization, i.e., by simultaneously or stepwise contacting and polymerizing a monomer mixture of 60 to 99.5% by weight of the above-mentioned ethylene, 0.5 to 40% by weight of one or more unsaturated glycidyl group-containing monomer, and 0 to 39.5% by weight of at least one other unsaturated monomer in the presence of 0.0001 to 1% by weight of a radical polymerization initiator based on the total weight of all the monomers at a polymerization pressure of 500 to 4,000 kg/cm$^2$, preferably 1,000 to 3,500 kg/cm$^2$, at a reaction temperature of 50 to 400° C., preferably 100 to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Additional examples of the epoxy group-containing olefin copolymer of the present invention include modified compounds prepared by the addition reaction of the above-mentioned unsaturated glycidyl group-containing monomers to conventional olefin homopolymers and copolymers.

Examples of the above-mentioned olefin polymer include homopolymers such as low-density, medium-density and high-density polyethylenes, polypropylenes, polybutene-1 and poly-4-methylpentene- 1, copolymers mainly comprising ethylene and other α-olefins such as ethylene-propylene copolymer, ethylene-butene-1 copolymer, ethylene-hexene-1 copolymer, ethylene-4-methylpentene-1 copolymer and ethylene-octene-1 copolymer, a copolymer mainly comprising propylene and another α-olefin such as propylene-ethylene block copolymer, copolymers with esters such as ethylene-vinyl acetate copolymer, ethylene-acrylic acid copolymer, ethylene-methacrylic acid copolymer, copolymers of ethylene and methyl, ethyl, propyl, isopropyl and butyl acrylate and methacrylate, ethylene-maleic acid copolymer, ethylene-propylene copolymer rubber, ethylene-propylene-diene-copolymer rubber, liquid polybutadiene, etylene-vinyl acetate-vinyl chloride copolymer and mixtures thereof.

Typical examples of the vinyl polymer and copolymer in the multi-phase structure thermoplastic resin used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, vinyl aromatic monomers, acrylonitrile and methacrylonitrile monomers and vinyl ester monomers are preferably employed.

The multi-phase structure thermoplastic resin used in the present invention is an epoxy group-containing olefin copolymer or a vinyl polymer or copolymer matrix in which another vinyl polymer or copolymer or epoxy group-containing olefin copolymer is uniformly dispersed in a spherical form.

The polymer dispersed in the multi-phase structure thermoplastic resin has a particle diameter of 0.001 to 10 μm, preferably 0.01 to 5 μm. When the particle diameter of the dispersed polymer is less than 0.001 μm or is more than 10 μm, compatibility to the resin deteriorates, with the result that for example, appearance degrades and impact resistance cannot be improved unpreferably.

The vinyl polymer or copolymer in the multi-phase thermoplastic resin (III) used in the present invention has a number average polymerization degree of 5 to 10,000, preferably 10 to 5,000.

When the number average polymerization degree is less than 5, impact resistance of the thermoplastic resin composition regarding the present invention cannot be improved. Inversely, when it is in excess of 10,000, melting viscosity is high, moldability deteriorates, and surface gloss falls off.

The multi-phase thermoplastic resin used in the present invention comprises 5 to 95% by weight, preferably 20 to 90% by weight, of the epoxy group-containing olefin copolymer. Therefore, the content of the vinyl polymer or copolymer is 95 to 5% by weight, preferably 80 to 10% by weight.

When the content of the epoxy group-containing olefin copolymer is less than 5% by weight, the improvement effect of impact resistance is insufficient. When it is more than 95% by weight, impact resistance is sufficiently improved, but heat resistance deteriorates.

As a grafting technique used to prepare the multi-phase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, water is suspended in 100 parts by weight of an epoxy group containing olefin copolymer. Afterward, 5 to 400 parts by weight of at least one vinyl monomer is added to the suspension, and in the mixture, a solution is poured in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which a decomposition temperature to obtain a half-life period of 10 hours is from 40 to 90° C. The mixture is then heated under conditions that the decomposition of the radical polymerization initiator does not occur substantially, in order to impregnate the epoxy group-containing olefin copolymer with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the epoxy group-containing olefin copolymer, thereby obtaining a graft polymerization precursor (A).

This graft polymerization precursor also is the multi-phase structure thermoplastic resin. Therefore, the graft polymerization precursor (A) may be directly melted and mixed with the ABS resin (I) and at least a kind of resin (II) selected from the polyamide resin and the aromatic polyester resin.

Furthermore, the multi-phase structure thermoplastic resin (III) of the present invention may be prepared by kneading the graft polymerization precursor (A) under melting at 100 to 300° C. At this time, the graft polymerization precursor may be mixed with the epoxy group-containing olefin copolymer (B) or the vinyl polymer or copolymer (C) and the mixture may be then kneaded under melting in order to similarly obtain the multi-phase structure thermoplastic resin (III).

Most preferable is the multi-phase structure thermoplastic resin (III) obtained by kneading the graft polymerization precursor.

The above-mentioned radical polymerizable or copolymerizable organic peroxides are compounds represented by the general formulae (a) and (b):

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl substituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylperoxyacryloyloxyethyl carbonate, t-butylperoxymethacryloyloxyethyl carbonate, t-amylperoxymethacryloyloxyethyl carbonate, 1,1,3,3-tetramethylbutylperoxymethacryloyloxyethyl carbonate, cumylperoxymethacryloyloxyethyl carbonate, p-isopropylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylperoxymethacryloyloxyethoxyethyl carbonate, t-butylperoxyacryloyloxyisopropyl carbonate, t-amylperoxymacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3 -tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-hexylperoxymethallyloxyisopropyl carbonate.

Of these compounds, preferable ones are t-butylperoxyacryloyloxyethyl carbonate, t-butylperoxymethacryloyloxy ethyl carbonate, t-butylperoxyallyl carbonate and t-butylperoxymethallyl carbonate.

In the present invention, amounts of the above-mentioned resins (I) and (II) depend upon the purpose of the composition of the present invention.

That is, when it is aimed that features of the ABS resin (I) are retained and the poor chemical resistance which is the drawback of the ABS resin (I) is improved, there is required 50 to 99% by weight, preferably 60 to 95% by weight, of the ABS resin.

When the ABS resin is less than 50% by weight, excellent moldability and impact resistance which are features of the ABS resin are impaired, and when it is in excess of 99% by weight, the improvement effect of chemical resistance which is one of the purposes of the present invention is not obtained.

With regard to the above-mentioned resin (II), if it is aimed that low impact strength is improved, maintaining features of the aromatic polyester resin, it is necessary that the content of the aromatic polyester resin is from 50 to 99% by weight, preferably from 60 to 95% by weight.

When the content of the aromatic polyester resin is less than 50% by weight, the excellent chemical resistance and stiffness which are features of the aromatic polyester resin are impaired, and when it is in excess of 99% by weight, the improvement effect of impact resistance which is one of the purposes of the present invention cannot be obtained.

Furthermore, if it is aimed that poor hydroscopicity, dimensional stability and impact resistance which are drawbacks of the polyadimde resin are improved, retaining features thereof, there is required 50 to 99% by weight, preferably 60 to 95% by weight, of the polyamide resin.

When the amount of the polyamide resin is less than 50% by weight, excellent moldability and wear resistance of the polyamide resin are impaired, and when it is in excess of 99% by weight, the improvement effect of moldability and dimesional stability which is one of the purposes of the present invention cannot be obtained.

In the present invention, the multi-phase structure thermoplastic resin is used in an amount of 0.1 to 100 parts by weight, preferably 1 to 50 parts by weight, based on 100 parts by weight of the total weight of the resins (I)+(II).

When the amount of the multi-phase structure thermoplastic resin is less than 0.1 part by weight, the compatibility effect is not present, impact strength deteriorates, and delamination occurs on molded articles, with the result that the appearance of the articles is degraded. When it is in excess of 100 parts by weight, stiffness and heat resistance of the composition of the present invention deteriorate.

In the present invention, the inorganic filler (IV) can be used in an amount of 1 to 150 parts by weight based on 100 parts of the components (I)+(II)+(III).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates. Inversely, when it is less than 1 part by weight, the modification effect cannot be exerted.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

Furthermore, in the present invention, the thermoplastic resin composition can be brought into a flame resistant state by blending therewith a flame retardant (V) in an amount of 5 to 150 parts by weight based on 100 parts by weight of the thermoplastic resin composition (I)+(II)+(III).

As the flame retardants, there can be used organic flame retardants of halogen series and phosphorus series, and inorganic flame retardants. The halogen series flame retardants include brominated and chlorinated paraffins such as tetrabromobisphenol (TBA), hexabromobenzene, decabromodiphenyl ether, tetrabromoethane (TBE), tetrabromobutane (TBB) and hexabromocyclodecane (HBCD), chlorine series flame retardants such as chlorinated paraffin, chlorinated polyphenyl, chlorinated polyethylene, chlorinated diphenyl, perchloropentacyclodecane and chlorinated naphthalene, usual halogen series flame retardants such as halogenated diphenyl sulfides, halogenated polystyrenes such as brominated polystyrene, brominated poly-α-methylstyrene and derivatives thereof, halogenated polycarbonates such as brominated polycarbonates, halogenated polyesters such as polyalkylene tetrabromoterephthalate and brominated terephthalic acid series polyesters, halogenated epoxy compounds such as halogenated bisphenol series epoxy resins, halogenated polyphenylene oxide compounds such as poly(dibromophenylene oxide), and high-molecular type halogen-containing polymers such as cyanuric acid ester compounds of halogenated bisphenols.

Of these flame retardants, oligomers and polymers of the aromatic halides are particularly preferred.

In addition, phosphorus series flame retardants include phosphates and halogenated phosphates such as tricresyl phosphate, tri(β-chloroethyl) phosphate, tri(-dibromopropyl) phosphate and 2,3-dibromopropyl-2,3-chloropropyl phosphate, phosphonic acid compounds and phosphonic acid derivatives.

Examples of other flame retardants include guanidine compounds such as guanidine nitride.

The above-mentioned organic flame retardants may be used alone or as a mixture of two or more thereof.

The organic flame retardant is used in an amount of 5 to 50 parts by weight, preferably 7 to 40 parts by weight based on 100 parts by weight of the thermoplastic resin composition (I)+(II)+(III). When the content of the flame retardant is less than 5 parts by weight, a flame-resistive effect is poor, and when it is more than 50 parts by weight, the flame-resistive effect is not improved any more and cost rises.

These organic flame retardants, particularly halogen series flame retardants can exert a synergistic effect, when used together with a flame-resistive auxiliary.

Examples of the flame-resistive auxiliary include antiomony halides such as antimony trioxide, antimony pentaoxide, antimony trichloride and antimony pentaoxide, and antimony compounds such as antimony trisulfide, antimony pentasulfide, sodium antimonate, antimony tartrate and metallic antimony.

In addition, examples of the inorganic flame retardants used in the present invention include aluminum hydroxide, magnesium hydroxide, zirconium hydroxide, basic magnesium carbonate, dolonite, hydrotalcite, calcium hydroxide, barium hydroxide, hydrate of stannous hydroxide, hydrates of inorganic metallic compounds of borax and the like, zinc borate, zinc metaborate, barium metaborate, zinc carbonate, magnesum-calcium carbonate, calcium carbonate, barium carbonate, magnesium oxide, molybdenum oxide, zirconium oxide, stannous oxide and red phosphorus. These inorganic flame retardants may be used alone or as a mixture of two or more thereof. Of these flame retardants, hydrates of metallic compounds of aluminum hydroxide, magnesium hydroxide, zirconium hydroxide, basic magnesium carbonate, dolonite, hydrotalcite are particularly preferable. Above all, aluminum hydroxide and magnesium hydroxide are effective as the flame retartants and are economically advantageous.

The particle diameter of the inorganic flame retardant depends upon its kind, but in the cases of aluminum hydroxide and magnesium hydroxide, the average particle diameter is 20 μm or less, preferably 10 μm or less.

The inorganic flame retardant is used in an amount of 30 to 150 parts by weight, preferably 40 to 120 parts by weight based on 100 parts by weight of the thermoplastic resin composition (I)+(II)+(III). When the content of the inorganic flame retardant is less than 30 parts by weight, a flame-resistive effect is poor in its single use, and thus it is necessary to add the organic flame retardant thereto. Inversely, when it is more than 150 parts by weight, impact strength and mechanical strength deteriorate. In the present invention, the above-mentioned inorganic filler and flame retardant may be employed simultaneously, whereby the content of the flame retardant can be decreased, and other characteristics can be acquired additionally.

The thermoplastic composition of the present invention can be prepared by melting/mixing the above-mentioned resin compositions (I)+(II)+(III) at a temperature of 230 to 350° C.

With regard to the order of the melting/mixing of the respective components, all of them may be melted/mixed simultaneously, but preferably the above-mentioned resin (I) or (II) and the resin (III) is first melted/mixed, and the mixture is then mixed with the other resin. In particular, it is desirable that the resin which will become a dispersion phase is dispersed in a uniform and fine state.

In melting and mixing, there may be used a usual kneader such as mixing rolls, a Banbury's mixer, a kneader mixer, a kneading extruder, a twin-screw extruder and rolls.

In the present invention, the following materials can be additionally used, in so far as they do not deviate from the gist of the present invention. Examples of such materials include polyolefin resins, polyvinyl chloride resin, polyvinylidene chloride resin, polycarbonate reins, fluoroplastics, polyphenylene oxide resins, polyoxymethylene resins, polysulfone resins, polyarylene sulfide resins, a natural rubber and a synthetic rubber, and additives such as an antioxidant, an ultraviolet inhibitor, a lubricant, a dispersant, a foaming agent, a crosslinking agent and a colorant.

Now, the present invention will be described in detail in reference to examples.

Preparation Example 1

Preparation of Multi-phase Structure Thermoplastic Resin IIIa

In a 5-liter stainless steel autoclave was placed 2,500 g of pure water, and 2.5 g of polyvinyl alcohol was further dissolved therein as a suspending agent. In the solution was placed 700 g of ethylene/glycidyl methacrylate copolymer (glycidyl methacrylate content=15% by weight; trade name Rexpearl J-3700; made by Nippon Petrochemicals Co., Ltd.) as an epoxy group-containing olefin copolymer, followed by stirring to suspend the copolymer therein in a nitrogen atmosphere. Separately, in a mixed monomer of 210 g of styrene and 90 g of acrylonitrile as a vinyl monomer were dissolved 1.5 g of benzoylperoxide as a radical polymerization initiator (trade name Nyper-B; made by Nippon Oils & Fats Co., Ltd.) and 6 g of t butylperoxymethacryloyloxyethyl carbonate as a radical polymerizable or copolymerizable organic peroxide, and the resulting solution was then placed in the above mentioned autoclave, followed by stirring.

Afterward, the autoclave was heated up to a temperature of 60 to 65° C., and stirring was then continued for 2 hours, so that the epoxy group-containing olefin copolymer was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80 to 85° C., and this temperature was then maintained for 7 hours to complete polymerization, followed by water washing and drying, thereby obtaining a graft polymerization precursor IIIa'. The latter IIIa' was then extracted with ethyl acetate in order to obtain styrene/acrylonitrile copolymer solution, and this solution was further placed in methanol to obtain a white powdery polymer. Afterward, the graft polymerization precursor was further extracted with xylene by the use of a Soxhlet extractor, and at this time, any xylene-insoluble material was not present therein.

Next, this graft polymerization precursor was extruded at 240° C. by a plastomill single-screw extruder (Toyo Seiki Seisaku-sho Ltd.) to perform graft reaction, whereby a multi-phase structure thermoplastic resin IIIa was obtained.

This multi-phase structure thermoplastic resin (EG-MA-g-AS) was then observed by a scanning type electron microscope (trade name JEOL JSM T300; made by JEOL, Ltd.), and it was found that it was a multi-phase structure thermoplastic resin in which spherical resin particles each having a diameter of 0.3 to 0.4 μm were uniformly dispersed. In this case, the grafting efficiency of the styrene/acrylonitrile copolymer was 49.0% by weight.

Preparation Example 2

Preparation of Multi-phase Structure Thermoplastic Resin IIIb

Figure 1:
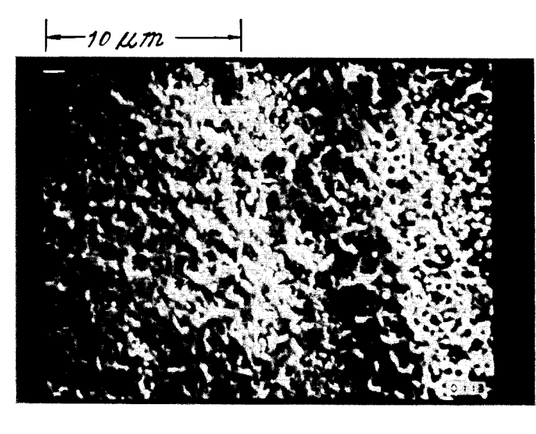

The same procedure as in Preparation Example 1 was repeated with the exception that the mixed monomer of 210 g of styrene and 90 g of acrylonitrile as a vinyl monomer was replaced with 300 g of styrene, thereby preparing a multi-phase structure thermoplastic resin (IIIb) via a graft polymerization precursor IIIb'. The average grain diameter of the resin dispersed in this multi-phase structure thermoplastic resin (EGMA-g-PSt) was in the range of 0.1 to 0.2 μm, as shown in the photograph No. 1 attached hereto.

EXAMPLES 1 to 7

The multi-phase structure thermoplastic resin obtained in Preparation Example 1 was mixed under melting, in ratios shown in Table 1, with an ABS resin comprising polybutylene terephthalate (PBT) having an intrinsic viscosity of 3.5 dl/g, 20% by weight of acrylonitrile, 55% by weight of styrene and 25 parts by weight of polybutadiene.

The melting/mixing process was carried out by dry-blending pellets of resins, feeding the blend into a one-directional twin-screw extruder having a cylinder temperature of 280° C. and a screw diameter of 30 mm, extruding the material therefrom, and then making grains therefrom. The thus made grains were dried in an atmosphere of 150° C. for 3 hours.

Afterward, specimens were prepared by the use of an injection molding machine having a cylinder temperature of 320° C. and a mold temperature of 90° C. Sizes of the thus prepared specimens were as follows:

| | |
|---|---|
| Specimens for notched izod impact strength | 13 × 65 × 6 mm |
| Specimens for heat distortion temperature | 13 × 128 × 6 mm |
| Specimens for bending strength | 13 × 220 × 6 mm |

Test procedures were as follows:

| | | |
|---|---|---|
| (1) | Notched izod impact strength | JIS K7110 |
| (2) | Heat distortion temperature (18.6 kg/cm²) | JIS K7207 |
| (3) | Bending strength | JIS K6758 |
| (4) | Chemical resistance | |

Each specimen was immersed in methanol at 75° C. for 30 days, and afterward the appearance of the specimen was observed.

O: Any change was not seen.
Δ: Cracks and partial dissolution were observed on the surface.
X: Dissolution on the surface was noticeable.

In addition, compatibility was estimated by inspecting whether or not a resin was delaminated from the rupture cross-section of the specimen.

TABLE 1

| Example | 1 | 2 | 3 | 4 | 5 | 6 | 7 |
|---|---|---|---|---|---|---|---|
| ABS Resin (wt %) | 80 | 80 | 60 | 50 | 30 | 20 | 20 |
| PBT (wt %) | 20 | 20 | 40 | 50 | 70 | 80 | 80 |
| Multi-Phase Structure Themoplastic Resin IIIa* | 10 | 20 | 20 | 20 | 20 | 10 | 20 |
| Notched Izod Impact Strength (kg · cm/cm) | 37 | 40 | 32 | 25 | 20 | 10 | 12 |
| Heat Distortion Temperature (°C.) (18.6 kg/cm²) | 120 | 117 | 136 | 144 | 150 | 165 | 160 |
| Flexural Modulus (× 10³ kg/cm²) | 19.0 | 18.5 | 18.0 | 19.0 | 19.5 | 22.0 | 21.0 |
| Chemical Resistance | O | O | O | O | O | O | O |
| (appearance) | | | | | | | |

*Parts by weight based on 100 parts by weight of ABS + PBT.

EXAMPLES 8 to 15

The same procedure as in the above-mentioned examples was repeated with the exception that the multi-phase structure thermoplastic resin was replaced with the graft polymerization precursor obtained in Preparation Example 1 and that a glass fiber having an average fiber length of 5.0 mm and a diameter of 10 μm was used. The results are set forth in Table 2.

TABLE 2

| Example | 8 | 9 | 10 | 11 | 12 | 13 | 14 | 15 |
|---|---|---|---|---|---|---|---|---|
| ABS Resin (wt %) | 80 | 80 | 60 | 50 | 50 | 30 | 20 | 20 |
| PBT (wt %) | 20 | 20 | 40 | 50 | 50 | 70 | 80 | 80 |
| Multi-phase Structure Thermoplastic Resin (IIIa)* | 20 | — | 20 | 20 | — | 20 | 20 | — |
| Graft Polymerization Precursor (IIIa')* | — | 20 | — | — | 20 | — | — | 20 |
| Glass Fiber* | 30 | 30 | 30 | 30 | 30 | 30 | 30 | 30 |
| Notched Izot Impact Strength (kg · cm/cm) | 64 | 65 | 55 | 39 | 40 | 38 | 37 | 35 |
| Heat Distortion Temperature (°C.) (18.6 kg/cm²) | 160 | 162 | 170 | 185 | 188 | 190 | 200 | 200 |
| Chemical Resistance (appearance) | O | O | O | O | O | O | O | O |

*Parts by weight based on 100 parts by weight of ABS + PBT.

EXAMPLES 16 to 21

In Examples 8, 9 and 14, flame retardants and assistants were further added in ratios shown in Table 3 in order to prepare flame specimens (¼"×½"×5"), and a vertical flame test was carried out in accordance with standards of UL-94.

TABLE 3

| Example | 16 | 17 | 18 | 19 | 20 | 21 |
|---|---|---|---|---|---|---|
| ABS Resin (wt %) | 80 | 80 | 80 | 80 | 20 | 20 |
| PBT (wt %) | 20 | 20 | 20 | 20 | 80 | 80 |
| Multi-Phase Structure Themoplastic Resin IIIa* | 20 | — | 20 | 20 | 20 | 20 |
| Graft Polymerization Precursor (IIIa')* | 0 | 20 | — | — | — | — |
| Glass Fiber** | 30 | 30 | 30 | 30 | 30 | 30 |
| Brominated Polystyrene** | 10 | 15 | 25 | — | 15 | — |
| Magnesium Hydroxide** | — | — | — | 70 | — | 100 |
| Antimony Trioxide** | 5 | 3 | 5 | — | 5 | — |
| UL-94 Flame | V-0 | V-0 | V-0 | V-2 | V-0 | V-0 |

TABLE 3-continued

| Example | 16 | 17 | 18 | 19 | 20 | 21 |
|---|---|---|---|---|---|---|
| Properties | | | | | | |

*Parts by weight based on 100 parts by weight of ABS + PBT.
**Parts by weight based on 100 parts by weight of ABS + PBT + multi-phase structure thermoplastic resin + graft polymerization precursor.

Brominated polystyrene:

Magnesium hydroxide: Average grain diameter = 5 μm.

COMPARATIVE EXAMPLES 1 to 7

The procedure of Example 1 was repeated with the exception that the multi phase structure thermoplastic resin was replaced with the ethylene-glycidyl methacrylate copolymer used in Preparation Example 1 and a modified material obtained by adding 0.5% by weight of maleic anhydride to ethylene/vinyl acetate copolymer (vinyl acetate content=15% by weight), and evaluation was made in the same manner as in Example 1. The results are set forth in Table 4.

TABLE 4

| Comp. Example | 1 | 2 | 3 | 4 | 5 | 6 | 7 |
|---|---|---|---|---|---|---|---|
| ABS Resin (wt %) | 80 | 60 | 60 | 50 | 30 | 30 | 20 |
| PBT (wt %) | 20 | 40 | 40 | 50 | 70 | 70 | 80 |
| Ethylene-Glycidyl Methacrylate Copolymer* | 20 | 20 | — | 20 | 20 | — | 20 |
| Modified Material of Ethylene-Vinyl Acetate Copolymer* | — | — | 20 | — | — | 20 | — |
| Notched Izod Impact Strength (kg · cm/cm) | 39 | 35 | 15 | 30 | 21 | 12 | 15 |
| Heat Distortion Temperature (°C.) (18.6 kg/cm²) | 103 | 119 | 101 | 125 | 135 | 130 | 140 |
| Flexural Modulus (×10³ kg/cm²) | 18 | 16.5 | 17 | 17 | 18 | 16.5 | 19 |
| Chemical Resistance (appearance) | O | O | O | O | O | O | O |

*Parts by weight based on 100 parts by weight of ABS + PBT.

EXAMPLES 22 to 29

ABS resins shown in Table 5, 6,6-nylon (trade name Amilan CM3001-N; made by Toray Industries, Inc.) as a polyamide resin and the multi-phase structure thermoplastic resin (IIIa) obtained in Preparation Example 1 were melted/mixed in ratios in Table 6.

The procedure of the melting/mixing and the preparation manner of specimens were the same as in Example 1.

Furthermore, the following test was given:

(1) State of Delamination:

The state of delamination was evaluated by attaching an adhesive tape to rupture cross-surfaces of molded articles, afterward detaching it, and visually observing the state on each surface. The delamination state was ranked as follows:

O: Any delamination was not observed.
Δ: Slight delamination was present.
X: Delamination was perceptibly seen.

TABLE 5

|  | ABS Resin (1) | ABS Resin (2) |
|---|---|---|
| Acrylonitrile (parts by weight) | 20 | 25 |
| Styrene (parts by weight) | 55 | 15 |
| α-Methylstyrene (parts by weight) | — | 40 |
| Polybutadiene (parts by weight) | 25 | 20 |
| Intrinsic Viscosity | 0.60 | 0.65 |

TABLE 6

| Example | 22 | 23 | 24 | 25 | 26 | 27 | 28 | 29 |
|---|---|---|---|---|---|---|---|---|
| ABS Resin (1) (wt %) | 75 | 75 | — | 50 | 50 | — | 20 | — |
| ABS Resin (2) (wt %) | — | — | 75 | — | — | 50 | — | 20 |
| 6,6-Nylon (wt %) | 25 | 25 | 25 | 50 | 50 | 50 | 80 | 80 |
| Multi-phase Structure Thermoplastic Resin (IIIb)* | 10 | 20 | 20 | 10 | 20 | 20 | 20 | 20 |
| Notched Izod Impact Strength (kg · cm/cm) | 8.0 | 9.2 | 10 | 4.5 | 5.0 | 6.0 | 3.0 | 3.5 |
| Heat Distortion Temperature (°C.) (18.6 kg/cm²) | 170 | 168 | 165 | 158 | 155 | 155 | 135 | 137 |
| Chemical Resistance (appearance) | O | O | O | O | O | O | O | O |
| Delamination | None | None | None | None | None | None | None | None |

*Parts by weight based on 100 parts by weight of ABS + 6,6-nylon (hereinafter referred to as PA).

EXAMPLES 30 to 34

The graft polymerization precursor (IIIb') obtained in Preparation Example 1 was used, and evaluation was made in the same manner as in Example 22. The results are set forth in Table 7.

TABLE 7

| Example | 30 | 31 | 32 | 33 | 34 |
|---|---|---|---|---|---|
| ABS Resin (1) (wt %) | 75 | 50 | — | 20 | — |
| ABS Resin (2) (wt %) | — | — | 50 | — | 20 |
| 6,6-Nylon (wt %) | 25 | 50 | 50 | 80 | 80 |
| Graft Polymerization Precursor (IIIb')* | 20 | 20 | 20 | 20 | 20 |
| Notched Izod Impact Strength (kg · cm/cm) | 8.8 | 5.3 | 5.5 | 3.2 | 3.7 |
| Heat Distortion Temperature (°C.) (18.6 kg/cm²) | 166 | 153 | 155 | 132 | 133 |
| Chemical Resistance (appearance) | O | O | O | O | O |
| Delamination | None | None | None | None | None |

*Parts by weight based on 100 parts by weight of ABS + PA.

EXAMPLES 35 to 40

In ratios shown in Table 8 given below, 100 parts of resins recited in the table was mixed with the multi-phase structure thermoplastic resin used in Example 1, a graft polymerization precursor used in Example 9 and an inorganic filler, i.e., a glass fiber having an average fiber length of 5.0 mm and a diameter of 10 μm. Evaluation was made in the same manner as in Example 1, and the results are set forth in Table 8.

TABLE 8

| Example | 35 | 36 | 37 | 38 | 39 | 40 |
|---|---|---|---|---|---|---|
| ABS Resin (1) (wt %) | 70 | — | 70 | 50 | — | 20 |
| ABS Resin (2) (wt %) | — | 70 | — | — | 20 | — |
| 6,6-Nylon (wt %) | 30 | 30 | 30 | 50 | 80 | 80 |
| Multi-phase Structure Thermoplastic Resin (IIIb)* | 20 | 20 | — | 20 | 20 | — |
| Graft Polymerization Precursor (IIIb')* | — | — | 20 | — | — | 20 |
| Glass Fiber* | 30 | 30 | 30 | 30 | 30 | 30 |
| Notched Izod Impact Strength (kg · cm/cm) | 8.9 | 9.5 | 9.0 | 7.0 | 3.0 | 2.8 |
| Heat Distortion Temperature (°C.) (18.6 kg/cm²) | 171 | 170 | 173 | 165 | 143 | 148 |

*Parts by weight based on 100 parts by weight of ABS + PA.

EXAMPLES 41 to 48

The same procedure as in Examples 32, 33, 35 and 36 was repeated with the exception that the same flame retardant and assistants as in Example 16 were additionally blended. The results are set forth in Table 9.

TABLE 9

| Example | 41 | 42 | 43 | 44 | 45 | 46 | 47 | 48 |
|---|---|---|---|---|---|---|---|---|
| ABS Resin (1) (wt %) | 70 | 70 | 70 | 70 | — | 20 | 20 | — |
| ABS Resin (2) (wt %) | — | — | — | — | 70 | — | — | 20 |
| 6,6-Nylon (wt %) | 30 | 30 | 30 | 30 | 30 | 80 | 80 | 80 |
| Multi-phase Structure Thermoplastic Resin (IIIb)* | 20 | — | 20 | 20 | 20 | 20 | 20 | 20 |
| Graft Polymerization Precursor (IIIb')* | — | 20 | — | — | — | — | — | — |
| Glass Fiber (wt %)** | 30 | 30 | 30 | 30 | 30 | 30 | 30 | 30 |
| Brominated Polystyrene** | 13 | 10 | 20 | — | 10 | 15 | — | 15 |
| Magnesium Hydroxide** | — | — | — | 100 | — | — | 150 | — |
| Antimony Trioxide** | 5 | 5 | 5 | — | 5 | 7 | — | 5 |
| UL-94 Flame Properties | V-0 | V-0 | V-0 | V-2 | V-0 | V-0 | V-1 | V-0 |

*Parts by weight based on 100 parts by weight of ABS + PA.
**Parts by weight based on 100 parts by weight of ABS + 6,6-nylon + multi-phase structure thermoplastic resin graft polymerization precursor.

COMPARATIVE EXAMPLES 8 to 12

The same procedure as in Example 1 was repeated with the exception that the multi-phase thermoplastic resin in Example 1 was replaced with the ethylene-glycidyl methacrylate copolymer used in Preparation Example 1 and the modified material of the ethylene/vinyl acetate copolymer used in Comparative Example 3, and evaluation was then made in the same manner as in Example 1. The results are set forth in Table 10.

TABLE 10

| Comp. Example | 8 | 9 | 10 | 11 | 12 |
|---|---|---|---|---|---|
| ABS Resin (wt %) | 70 | 70 | 50 | 20 | 20 |
| 6,6-Nylon (wt %) | 30 | 30 | 50 | 80 | 80 |
| Ethylene-Glycidyl Methacrylate Copolymer* | 20 | — | 20 | 20 | — |
| Modified Material* of Ethylene-Vinyl Acetate Copolymer | — | 20 | — | — | 20 |
| Notched Izod Impact Strength (kg · cm/cm) | 4.3 | 4.5 | 3.0 | 2.3 | 2.6 |
| Heat Distortion Temperature (°C.) (18.6 kg/cm²) | 158 | 155 | 150 | 130 | 131 |
| Chemical Resistance (appearance) | X | X | Δ | X | X |
| Delamination | It occurred in all Comp. Examples. | | | | |

*Parts by weight based on 100 parts by weight of ABS + PA.

The thermoplastic resin composition of the present invention effectively has different features of raw material resins, and it is excellent in moldability, impact resistance, heat resistance, dimensional stability and chemical resistance. Degrees of impact strength and heat resistance can be regulated by suitably selecting a blending ratio of a multi-phase structure thermoplastic resin to be mixed, and therefore the present invention can meet a variety of demands.

As is apparent from the foregoing, the thermoplastic resin composition of the present invention can be widely utilized as materials for, e.g., automobile parts, electrical and electronic machine parts, and other industrial parts.

What is claimed is:

1. A thermoplastic resin composition containing
   (I) 99 to 1% by weight of an ABS resin,
   (II) 1 to 99% by weight of at least one kind of resin selected from an aromatic polyester resin and a polyamide resin
   (III) 0.1 to 100 parts by weight, based on 100 parts by weight of the aforesaid resins (I)=(II), of a multi-phase structure thermoplastic resin which is composed of 5 to 95% by weight of an epoxy group-containing olefin copolymer and 95 to 5% by weight of a vinyl polymer or copolymer obtained from at least one kind of vinyl monomer, the polymer or copolymer being in the state of a dispersion phase having a particle diameter of 0.001 to 10 μm, wherein the multi-phase structure thermoplastic resin is a mixture and/or a grafted compound prepared by melting and mixing the mixture which comprises
   1 to 100% by weight of a graft polymerization precursor (A) obtained by copolymerizing at least one vinyl monomer with at least one of radical polymerizable or copolymerizable organic peroxide represented by the following general formulae (a) and (b)

wherein $R_1$ is a hydrogen atom or an alkyl group having 1 to 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2 in particles of an epoxy group-containing olefin copolymer, 0 to 99% by weight of an epoxy group-containing olefin copolymer (B), and 0 to 99% by weight of a vinyl polymer or copolymer (C) obtained by polymerizing or copolymerizing at least one vinyl monomer.

2. A thermoplastic resin composition according to claim 1 wherein the number average polymerization degree of the vinyl polymer or copolymer in the multiphase structure thermoplastic resin is in the range of 5 to 10,000.

3. A thermoplastic resin composition according to claim 1 wherein the vinyl monomer is at least one vinyl monomer selected from the group consisting of vinyl aromatic monomers, acrylate and methacrylate monomers, acrylonitrile and methacrylonitrile monomers, and vinyl ester monomers.

4. A thermoplastic resin composition according to claim 1 wherein the epoxy group-containing olefin copolymer is composed of 60 to 99.5% by weight of ethylene, 40 to 0.5% by weight of glycidyl acrylate or methacrylate, and 0 to 39.5% by weight of another unsaturated monomer.

5. A thermoplastic resin composition according to claim 1 wherein an inorganic filler is additionally blended therein in an amount of 1 to 150 parts by weight based on 100 parts by weight of the thermoplastic resin composition (I)+(II)+(III).

6. A thermoplastic resin composition according to claim 1 wherein a flame retardant is additionally blended therein in an amount of 5 to 150 parts by weight based on 100 parts by weight of the thermoplastic resin composition (I)+(II)+(III).

7. A thermoplastic resin composition according to claim 1 wherein the resin (II) is an aromatic polyester resin.

8. A thermoplastic resin composition according to claim 7 wherein the aromatic polyester resin is polybutylene terephthalate.

9. A thermoplastic resin composition according to claim 8 wherein the number average polymerization degree of the vinyl polymer or copolymer in the multiphase structure thermoplastic resin is in the range of 5 to 10,000.

10. A thermoplastic resin composition according to claim 9 wherein the epoxy group-containing olefin copolymer is composed of 60 to 99.5% by weight of ethylene, 40 to 0.5% by weight of glycidyl acrylate or methacrylate, and 0 to 39.5% by weight of another unsaturated monomer.

11. A thermoplastic resin composition according to claim 10 wherein the ABS resin has a particle size of 0.05 to 1 $\mu$m and an intrinsic viscosity of 0.25 to 1, the aromatic polyester resin has an intrinsic viscosity of 0.4 to 4, and the epoxy group containing olefin copolymer has a particle size of 0.001 to 10 $\mu$m.

12. A thermoplastic resin composition according to claim 1 wherein the ABS resin has a particle size of 0.05 to 1 $\mu$m and an intrinsic viscosity of 0.25 to 1, the aromatic polyester resin has an intrinsic viscosity of 0.4 to 4, and the epoxy group containing olefin copolymer has a particle size of 0.001 to 10 $\mu$m.

* * * * *